United States Patent [19]

Pequegnat

[11] 4,084,543
[45] Apr. 18, 1978

[54] AQUATIC BIOTAL MONITOR

[75] Inventor: Willis E. Pequegnat, College Station, Tex.

[73] Assignee: TerEco Corporation, College Station, Tex.

[21] Appl. No.: 717,701

[22] Filed: Aug. 25, 1976

[51] Int. Cl.$^2$ ............................................. A01K 61/00
[52] U.S. Cl. ............................................. 119/3; 4/171
[58] Field of Search ................................ 119/2–5; 4/171; 47/1; 43/56; 114/.5 T; 73/170 A

[56] References Cited

U.S. PATENT DOCUMENTS

| | | | |
|---|---|---|---|
| 1,925,175 | 9/1933 | Day | 4/171 |
| 2,813,507 | 11/1957 | Miller | 119/3 |
| 3,571,819 | 3/1971 | Puncochar | 4/171 |
| 3,683,854 | 8/1972 | Lewis | 119/3 |
| 3,691,994 | 9/1972 | McPherson | 119/3 |
| 3,698,359 | 10/1972 | Fremont | 119/3 |
| 3,702,599 | 11/1972 | Herolzer | 119/4 |
| 3,717,124 | 2/1973 | Jacobs | 119/3 |

FOREIGN PATENT DOCUMENTS 2,016,135   10/1971   Germany ................................. 119/3

Primary Examiner—Jay N. Eskovitz
Attorney, Agent, or Firm—Richards, Harris & Medlock

[57] ABSTRACT

The specification discloses an aquatic biotal monitor for monitoring the chronic impact of pollution, such as chemical, thermal and turbidity, of aquatic environments upon in situ samples of biota. The monitor includes a top and bottom mounting ring. A water permeable mesh extends between and interconnects the mounting rings and encloses the bottom ring to form a closed and cylindrical enclosure to retain the biotal sample. The cylindrical enclosure permits the free exchange of ambient water between the outside of the cylindrical enclosure and the inside of the enclosure. The monitor further includes flotation structure attached to the top ring for floating the cylindrical enclosure in the body of water, such that the enclosure monitors the impact of changing aquatic environments on the biotal sample. In addition, the monitor can be anchored at a selected site for studying the impact over periods of time of pollutants emanating continuously.

6 Claims, 12 Drawing Figures

AQUATIC BIOTAL MONITOR

FIELD OF THE INVENTION

This invention relates to monitoring devices, and more particularly to an aquatic biotal monitoring device for detecting chronic impacts of chemical or thermal pollution of aquatic environments upon in situ biotal samples.

THE PRIOR ART

In recent years, concern for the quality of our environment and in particular, the quality of the oceans of the world has dramatically increased. Governments as well as private industry are now undertaking measures to reverse the effects of pollution on bodies of water and are taking steps to prevent aquatic pollution. Such pollution typically includes: thermal pollution from electric generating plants, oil pollution from offshore oil rigs and oil tanker spills, chemical pollution from the dumping of industrial waste into bodies of water, chemical fallout pollution from the burning of industrial waste material and turbidity pollution resulting from man-induced resedimentation.

Oceans as well as lakes and rivers provide a source of food and recreation, both of which are detrimentally effected by thermal and chemical pollution. As a first step to preventing aquatic pollution scientists must determine the source and scope of existing pollutants. Heretofore, scientists have used plant and animal samples to test regions of water to detect the presence of pollutants and to determine the pollutants' effect on the samples under observation. In the course of such scientific investigation, ocean monitoring devices are utilized to retain the sample under study.

It is not particularly difficult to detect the acute impacts of chemical or thermal pollution of aquatic environments upon the plant and animal, hereinafter referred to as biota, components of the environment. Acute effects develop quickly and therefore do not ordinarily require special monitoring devices for retaining organisms which quickly develop reactions to the pollutants.

The detection of chronic impacts of pollution of aquatic environments upon the biotal samples, however, require the same sample to be continuously exposed to the pollutants over extended periods of time in order for a meaningful investigation to be conducted. Chronic effects take time to develop and therefore a biotal sample must be continuously monitored.

There are two fundamental approaches to the monitoring of chronic impacts. The first approach involves laboratory studies, whereas the second approach involves field studies. For the most part, laboratory studies are less satisfactory because species of the biota native to the impacted site may not be adaptable to laboratory conditions, and it is difficult to adjust laboratory levels of impacting substances or heat to levels occurring in the field. As a consequence, field studies are superior if a specific sample of the biota can be exposed to the environmental impact and continuously monitored in the field until sufficient time has elapsed for the chronic effect to develop. These chronic effects may take from about 96 hours to 30 days to develop. Previously developed monitoring devices have retained organisms in cagelike structures, but such devices have heretofore not permitted the monitoring of chronic impacts. Prior devices have also been designed for environmental studies which utilize impervious enclosure walls designed to keep ambient water out of contact with the biotal sample. Such prior devices have not thus provided a monitor which can retain a biotal sample for extended periods of time while exposing the biotal sample to continuously changing aquatic environments to monitor the chronic impact of thermal and chemical pollution.

A need has thus arisen for an aquatic biotal monitoring device which will retain a biotal sample for extended periods of time and expose the sample to continuously changing aquatic environments. Moreover, a need has arisen for a biotal monitoring device that will permit the detection of chronic impacts of pollution of aquatic environments upon a biotal sample, which can be identified both before and after being exposed to the pollutant.

SUMMARY OF THE INVENTION

In accordance with the present invention, an aquatic biotal monitor, system and monitoring method are presented which enable the detection of chronic impacts of varying pollution of aquatic environments upon a biotal sample. The monitor permits a biotal sample to be continuously exposed to ambient water and to freely float with extant currents to experience the impact of changing aquatic environments.

In accordance with the present invention, a biological monitoring device for monitoring in situ samples of the biota in a body of water includes a top and bottom mounting ring. A water permeable mesh extends between and interconnects the rings and is enclosed by the bottom ring to form a cylindrical enclosure to retain the biotal sample. The enclosure permits the free exchange of ambient water between the outside of the enclosure and the inside of the enclosure. A flotation structure is provided for floating the cylindrical enclosure in the body of water, such that the enclosure freely drifts with extant currents.

In accordance with another aspect of the present invention, a biological monitoring system for continuously monitoring in situ the effects of aquatic pollution on several different samples of biota in a body of water includes a main cylindrical container having water permeable walls and bottom portions. The main cylindrical container permits the free exchange of ambient water from exterior of the main container to within the main container. The main cylindrical container further includes flotation structure for floating the main container in the body of water such that the main container is free to float with extant currents. The monitoring system further includes a plurality of subcontainers having diameters smaller than the main container and having water permeable walls and bottom portions. The subcontainers are contained and float within the volume of water defined by the main container. The side walls of the plurality of subcontainers have permeabilities less than the permeability of the walls of the main container, such that each subcontainer retains a different sample of biota to enable independent monitoring of the samples from one another and from a sample monitored in the main container.

DESCRIPTION OF THE DRAWINGS

For a more complete understanding of the present invention and for further objects and advantages thereof, reference is now made to the following detailed description taken in conjunction with the accompanying drawings, in which.

DESCRIPTION OF THE PREFERRED EMBODIMENT

Figure 1:
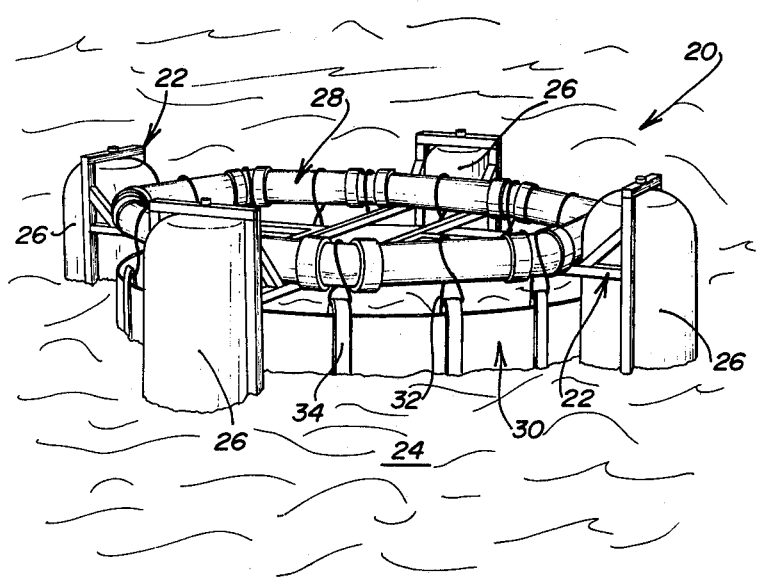
FIG. 1 is a perspective view of a portion of the aquatic biotal monitoring device showing a preferred embodiment of the present invention.

FIG. 1 illustrates an embodiment of the aquatic biotal monitor of the present invention and is identified generally by the numeral 20. The biotal monitor 20 includes a flotation support structure identified generally by the numeral 22, which is supported in a body of water 24 by floats 26. Floats 26 are hollow cylindrical shaped chambers and may be formed for example, from a light weight plastic material such as polyvinyl chloride.

The flotation support structure 22 is mounted to a top mounting ring or member identified generally by the numeral 28. Mounting ring 28 suspends an enclosure identified generally by the numeral 30, which extends above the surface of water 24. Enclosure 30 is suspended by ring 28 using flexible suspension lines 32, which extend through strap members 34 interconnected to enclosure 30.

Figure 2:
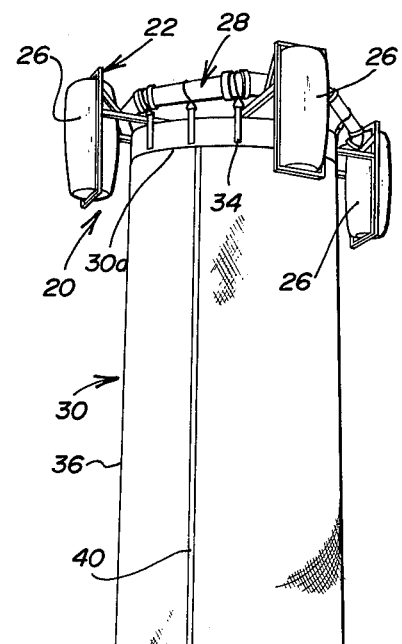
FIG. 2 is a perspective view of the entire aquatic biotal monitoring device shown in FIG. 1.

Referring now to FIG. 2, the biotal monitor 20 in its fully extended position and removed from the water environment is illustrated. Enclosure 30 includes a cylindrically shaped wall 36, which comprises a water permeable mesh. Wall 36 may comprise, for example, a netting composed of a nontoxic synthetic fibre such as nylon, which is permeable to water and dissolved materials but which is impervious to biota of the preselected size. The permeable wall 36 thus serves to retain a biotal sample placed within the monitor 20 while permitting the free exchange of ambient water between the outside of enclosure 30 and the area within the wall 36. The mesh size of wall 36 is dependent upon the size of the biota being monitored, but can include apertures sized from about 10 microns to about 2000 microns.

In the preferred embodiment, the diameter of the biotal monitor 20 is approximately 4 feet. The overall height of enclosure 30 is approximately 12 feet, while the funnel-shaped extension 46 is approximately 2 feet high. The overall length of biotal monitor 20 is therefore approximately 14 feet. The floats 26 are approximately 10 inches in diameter and approximately 27 inches in height.

Wall 36 is composed of a series of continuous rectangular panels 38, which are joined by a nylon webbing 40. The nylon webbing 40 extends from the upper end 30a of enclosure 30 to the lower end 30b of enclosure 30 and serves to increase the strength of the enclosure 30 and prevents damage under storm stresses. The lower end 30b of enclosure 30 is mounted to a bottom mounting ring 42. Bottom mounting ring 42 includes a plurality of weights 44 circumferentially mounted around ring 42 which serve to maintain the enclosure 30 in its fully extended position as shown in FIG. 2 when placed in a water environment.

Attached to the lower end 30b of enclosure 30 is a funnel-shaped extension 46. A cylindrical extension 48 is interconnected to the lower end 46b of funnel-shaped extension 46. The cylindrical extension 48 is interconnected to an open ended hollow cylinder 50, which is interconnected to a collection bag 52. Hollow cylinder 50 includes upper and lower flanges 50a and 50b and may comprise for example, a polyvinyl chloride pipe having a diameter of 12 inches. Cylinder 50 is affixed to the cylindrical extension 48 and collection bag 52 using adjustable hose clamps 54. Clamps 54 permit the easy removal of the collection bag 52 for inspection of the bag's contents or replacement during the sampling process. Cylindrical extension 48 and the collection bag 52 may comprise a nylon webbing similar to the webbing 40.

In operation, before placement of the biotal monitor 20 in a body of water, the wall 36 is folded such that the top mounting ring 28 and bottom mounting ring 42 are in close proximity to each other. The monitor 20 is then placed upon the surface of the body of water and is supported on the surface by the flotation support structure 22. Because the lower mounting ring 42 is weighted by weights 44, the enclosure 30 will expand downwardly under water to its fully extended position as illustrated in FIG. 2. The permeable wall 36 of enclosure 30 will then permit the ambient water to fill the area within wall 36 and permit the free exchange of ambient water from outside enclosure 30 to within the enclosure. Once the enclosure 30 is fully extended, the sample of biota is deposited or pumped into enclosure 30, which then functions as a floating laboratory cage for the biotal sample.

The biotal monitor 20 therefore, retains a plant or animal sample under study while allowing the sample to be exposed to continuous changes due to varying pollution of the aquatic environment. The biota under investigation may comprise for example, zooplankton, phytoplankton and nekton such as fish, squid and octopus. The monitor 20 retains the same plant or animal sample so that a sample that was exposed to the initial pollutant is still under study at the end of a test when exposed to the final pollutant.

The actual monitoring process utilizing the biotal monitor 20 may include several procedures. For example, a scientist may on a day-to-day basis or over a longer time interval collect subsamples of the biota sample under investigation. This collection procedure can be accomplished by using a small hand manipulated net such as a six inch plankton net, which is lowered into the top end of enclosure 30 to collect a subsample.

The monitoring process may also include periodic retrieval of dead biotal samples, which have settled to the bottom of enclosure 30 and have collected in the bag 52. A team of divers can detach the bag 52 and replace it with an unused collection bag to be used during the next time interval. Alternatively, the collection bag 52 can be sampled once at the conclusion of the testing period. At the conclusion of the test, the biotal monitor 20 is removed from the water. A ship mounted crane is attached to the flotation support structure 22 to lift the monitor 20 from the water. A quantity of water will remain in the extension 46 while the monitor 20 is being removed from the water to provide an aquatic environment for the biotal sample until the sample is removed to the laboratory.

The monitoring process utilizing the present invention can continue over extended periods of time so that the chronic impacts of various pollutants in aquatic environments upon the biotal sample contained within the enclosure 30 can be continuously monitored. The flotation support structure 22 allows the enclosure 30 to freely drift with the water mass and since the enclosure wall 36 permits the free exchange of ambient waters, while retaining the sample, the same sample can be continuously exposed to changing aquatic environments.

Figure 3:
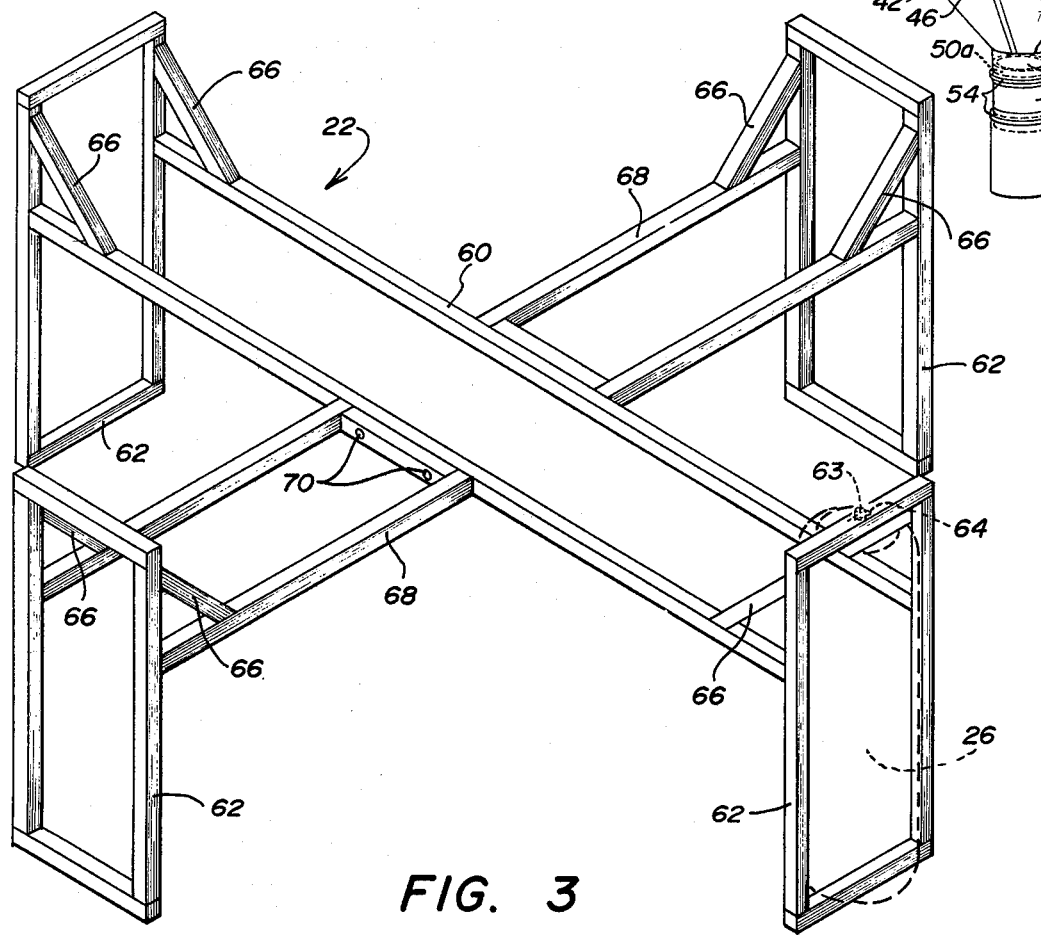
FIG. 3 is a perspective view of the flotation support structure of the aquatic biotal monitoring device shown in FIG. 1.

Referring now to FIG. 3, the flotation support structure 22 is illustrated. The flotation support structure 22 includes a main rectangular frame 60, which interconnects terminal rectangles 62. The terminal rectangles 62 are dimensioned to receive and mount one of the cylindrical floats 26 using an aluminum rod 63 and a pin or safety clip 64. The terminal rectangles 62 are welded and positioned perpendicularly to the main rectangular frame 60 and are further interconnected using angular support members 66. Angular support members 66 are similarly welded between a terminal rectangle 66 and the main rectangular frame 60.

The flotation support structure 62 further includes rectangular subframes 68, which are perpendicularly mounted to the main rectangular fram 60 using bolts 70. Attached to the exterior ends of the subframe members 68 are terminal rectangles 62, which receive a cylindrical float 26 as previously described. Interconnected between the terminal rectangles 62 and the subframe 68 are angular support members 66, which serve to strengthen the support structure 22.

It can be seen that the flotation support structure 22 comprises a four-point suspension system utilizing the four floats 26. The suspension therefore, permits the free circulation of ambient water around and through the upper portion of the biotal monitor 20 at the water surface, as well as free circulation through the remainder of the monitor 20. This circulation of ambient water through the upper portion of the monitor 20 is important to assure that the entire sample, no matter where positioned within the enclosure 30, is uniformly exposed to the pollutants present in the ambient water. The structure 22 also lifts the upper end 30a of enclosure 30 well above the surface of the water to prevent the escape of larger animals. The structural members of the flotation support structure 22 may comprise a lightweight material and one which does not require extensive maintenance such as aluminum tubing.

Figure 4:
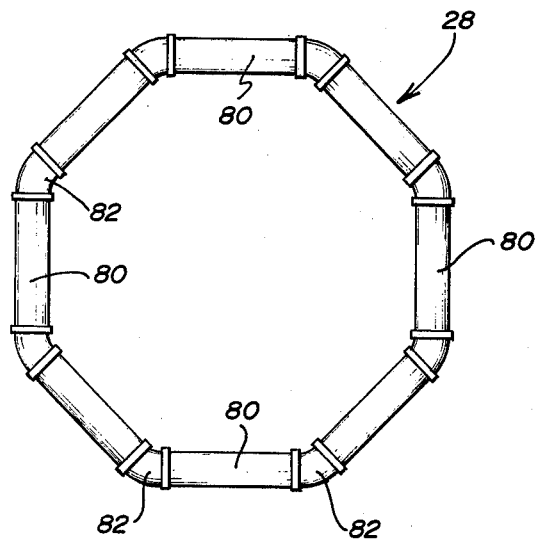
FIG. 4 is a top plan view of the top mounting ring of the monitoring device shown in FIG. 1.

Referring now to FIG. 4, the top mounting ring 28 is illustrated and comprises eight segments of hollow tubing 80 interconnected by elbow members 82. The tube segments 80 and elbow members 82 form a hexagonal structure and may comprise, for example, polyvinyl chloride pipe having a diameter of four inches. The top mounting ring 28 is dimensioned to be received between the angular support members 66 of the flotation support structure 22 (FIG. 3) and is affixed to the rectangular frames 60 and 68 using bolts (not shown) or similar fasteners.

Figure 5:
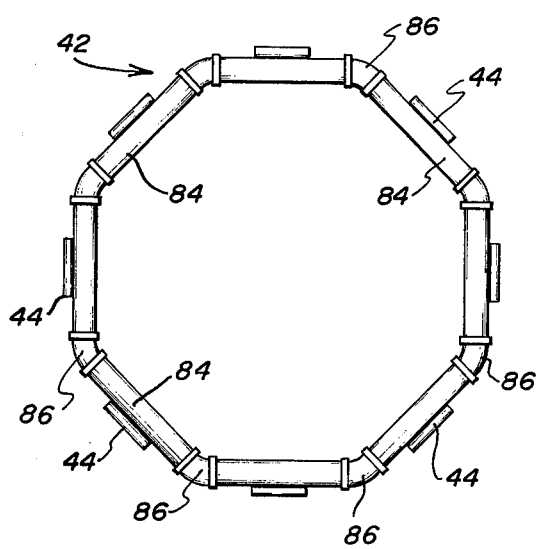
FIG. 5 is a top plan view of the bottom mounting ring of the monitoring device shown in FIG. 1.

Referring to FIG. 5, the bottom mounting ring 42 is illustrated. Bottom mounting ring 42 has a hexagonal configuration similar to the top mounting ring 28 (FIG. 4). Ring 42 comprises eight hollow tube segments 84 which are interconnected by elbow members 86. The hollow tube segments 84 and elbow members 86 may comprise, for example, polyvinyl chloride pipe having a diameter of two inches. Mounted centrally on each tube segment 84 is a weight 44. As previously described, weights 44 serve to extend the enclosure 30 after the monitor 20 is placed on the water surface. Bottom mounting ring 42 is affixed to the lower end 30b of enclosure 30 using for example, ropes or other flexible elongate fasteners.

Figure 6:
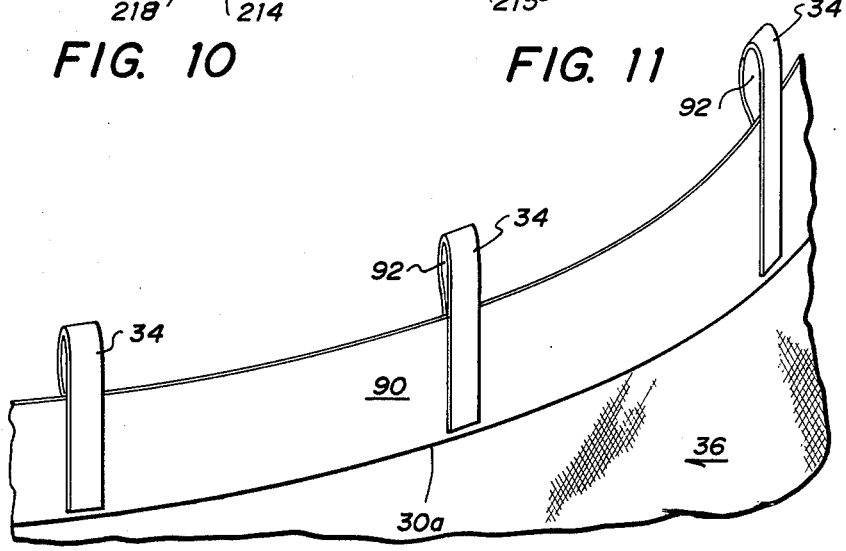
FIG. 6 is a partial perspective view of the upper end of the enclosure of the monitoring device shown in FIG. 1.

Referring to FIG. 6, a section of the upper portion 30a of enclosure 30 is illustrated. Integral with enclosure 30 is a collar 90, which is circumferentially attached to the upper portion 30a of enclosure 30. The collar 90 is composed of a nylon webbing to provide added strength to the upper portion 30a of enclosure 30 and for attachment of straps 34. Straps 34 are integrally attached to collar 90 on the interior and exterior surfaces of collar 90 to form a loop 92 through which rope 32 (FIG. 1) passes to attach the enclosure 30 to the top mounting ring 28.

Figure 7:
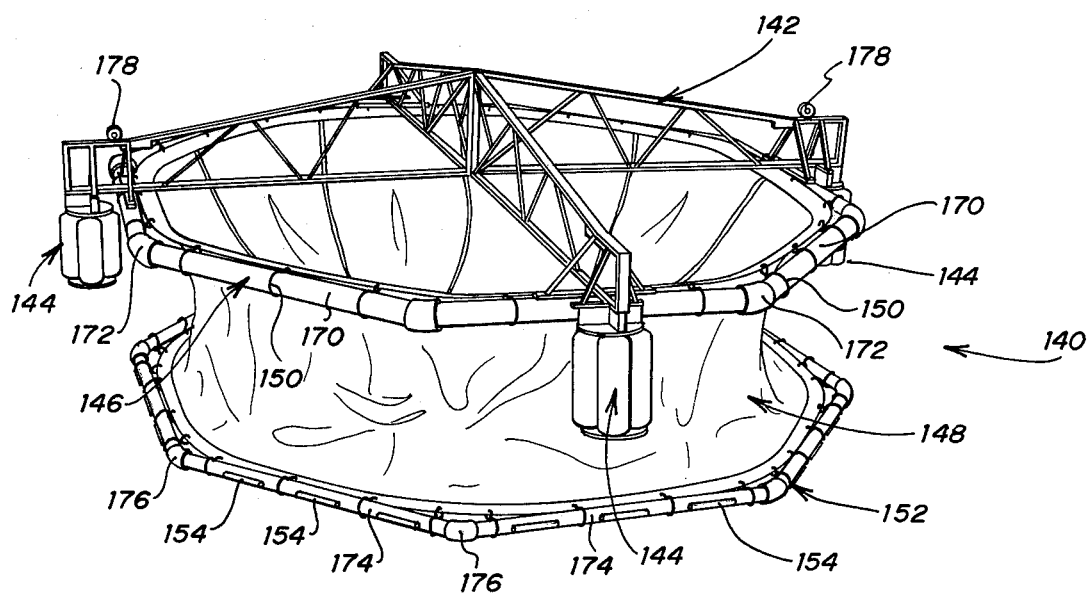
FIG. 7 is a perspective view of a second embodiment of the aquatic biotal monitoring device of the present invention.
Figure 8:
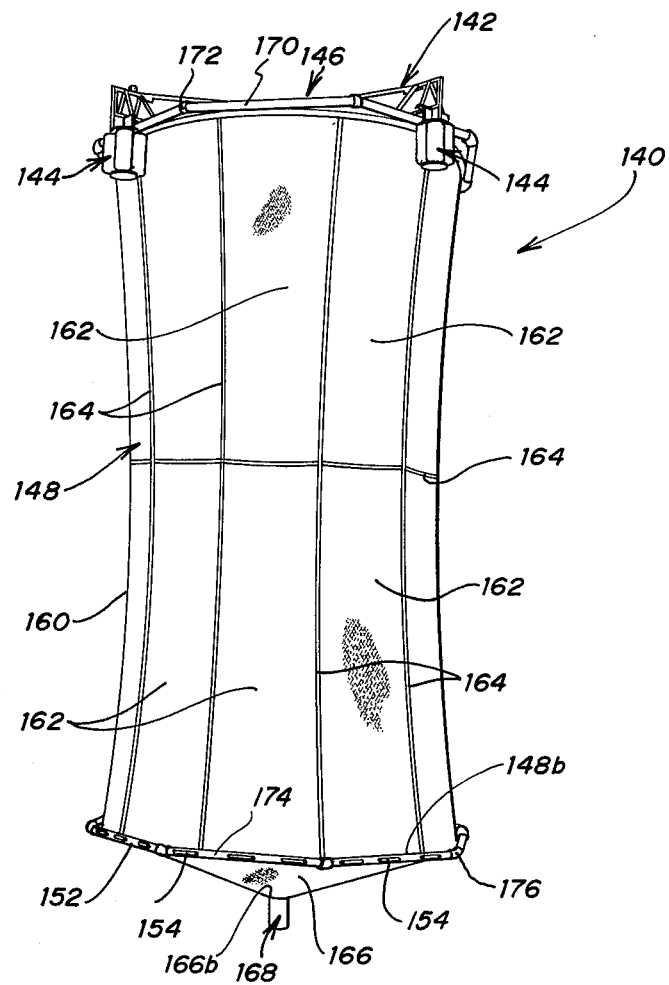
FIG. 8 is a perspective view of the second embodiment of the present invention showing the monitoring device in its fully extended position.

Referring simultaneously to FIGS. 7 and 8, a second embodiment of the present aquatic biotal monitor is illustrated and identified generally by the number 140. Biotal monitor 140 is substantially larger in diameter than the monitor 20 (FIG. 1) previously described and therefore, has the capability for enclosing a larger sample and larger species of plant and animal life under study. In the preferred embodiment, the diameter of monitor 140 is approximately 21 feet and the overall height of monitor 140 is 42 feet. Monitor 140 includes a flotation support structure identified generally by the numeral 142, which is supported in a body of water by flotation structures identified generally by the numeral 144.

Flotation structures 144 support the flotation support structure 142, which in turn suspends a top mounting ring 146. Top mounting ring 146 suspends a cylindrical enclosure identified generally by the numeral 148 using fasteners such as ropes 150. In the preferred embodiment, enclosure 148 is approximately 37 feet in height. Attached to the lower end 148b of cylindrical enclosure 148 is a bottom mounting ring identified generally by the numeral 152, which is shaped similarly to top mounting ring 146. Bottom mounting ring 152 includes a plurality of weights 154, which permit cylindrical member 148 to expand to its fully extended position (FIG. 8) when placed in a body of water.

Referring to FIG. 8, the cylindrical enclosure 148 comprises a water permeable wall 160, which permits the free flow of ambient water from outside cylindrical enclosure 148 to the interior of cylindrical enclosure 148. Water permeable wall 160 includes a plurality of rectangular shaped panels 162 interconnected by nylon webbing 164. The use of panels 162 and webbing 164 increases the strength of enclosure 148 and prevents damage under storm stresses. Walls 160 comprise a nontoxic nylon mesh having apertures sized from about 10 microns to about 2000 microns to permit water and dissolved material to permeate the enclosure 148, while retaining a biotal sample under investigation.

Attached to the lower end 148b of enclosure 148 is a bottom closure wall 166, which is also water permeable and in the preferred embodiment is approximately 5 feet in height. Attached to the lower end 166b of closure wall 166 is a collection bag assembly 168 similar in construction and use to the collection bag 52 (FIG. 2).

The top and bottom mounting rings 146 and 152, are similar in shape to the top and bottom mounting rings 28 and 42 of monitor 20 (FIGS. 4 and 5). The top mounting ring 146 comprises eight segments of hollow tubing 170, such as for example, polyvinyl chloride pipe having a diameter of 6 inches. The tube segments 170 are interconnected by elbow members 172, which may also be constructed from polyvinyl chloride. The bottom mounting ring 152 comprises eight hollow tube sections 174, which are joined together by elbow members 176. Tube segments 174 may comprise for example polyvinyl chloride pipe having a diameter of four inches.

The operation of the biotal monitor 140 is similar to that previously described with respect to monitor 20 (FIG. 1). The monitor 140 is lowered to the surface of a body of water and has an initial collapsed configuration as shown in FIG. 7. As the ambient water enters the interior of enclosure 148, and as the weights 154 extend the enclosure 148, the monitor 140 takes on the configuration illustrated in FIG. 8. Once the monitor 140 is fully extended, a biotal sample can be deposited or pumped into enclosure 148 and the effect of ambient waters on the sample can be studied. The flotation support structure 142 and flotation structures 144 will allow the biotal monitor 140 to freely drift with extant currents so that the chronic impact of pollution of the aquatic environment can be detected and observed upon the biotal sample.

The sampling procedure utilizing biotal monitor 140 is similar to that described with respect to monitor 20 (FIG. 1). However, because of the size of monitor 140 and the volume of water contained therein, the monitor 140 cannot be simply lifted from the body of water using a crane. Winches 178, which are mounted to the flotation support structure 142, are used to assist in the removal of monitor 140 from the body of water. The winches 148 are interconnected to a pulley system, which is attached to the bottom mounting ring 152. Upon actuation of the winches 178, the bottom mounting ring 152 will be drawn upward towards the top mounting ring 146. When the rings are in clsoe proximity to one another they can be tied together. A crane can then lift the monitor 140 from the water's surface to a boat. The biotal sample will be retained within the walls 160 and also in the bottom portion of enclosure 148, which will retain a quantity of water to provide a natural environment for the biotal sample prior to being transferred to suitable containers for transport to the laboratory.

Figure 9:
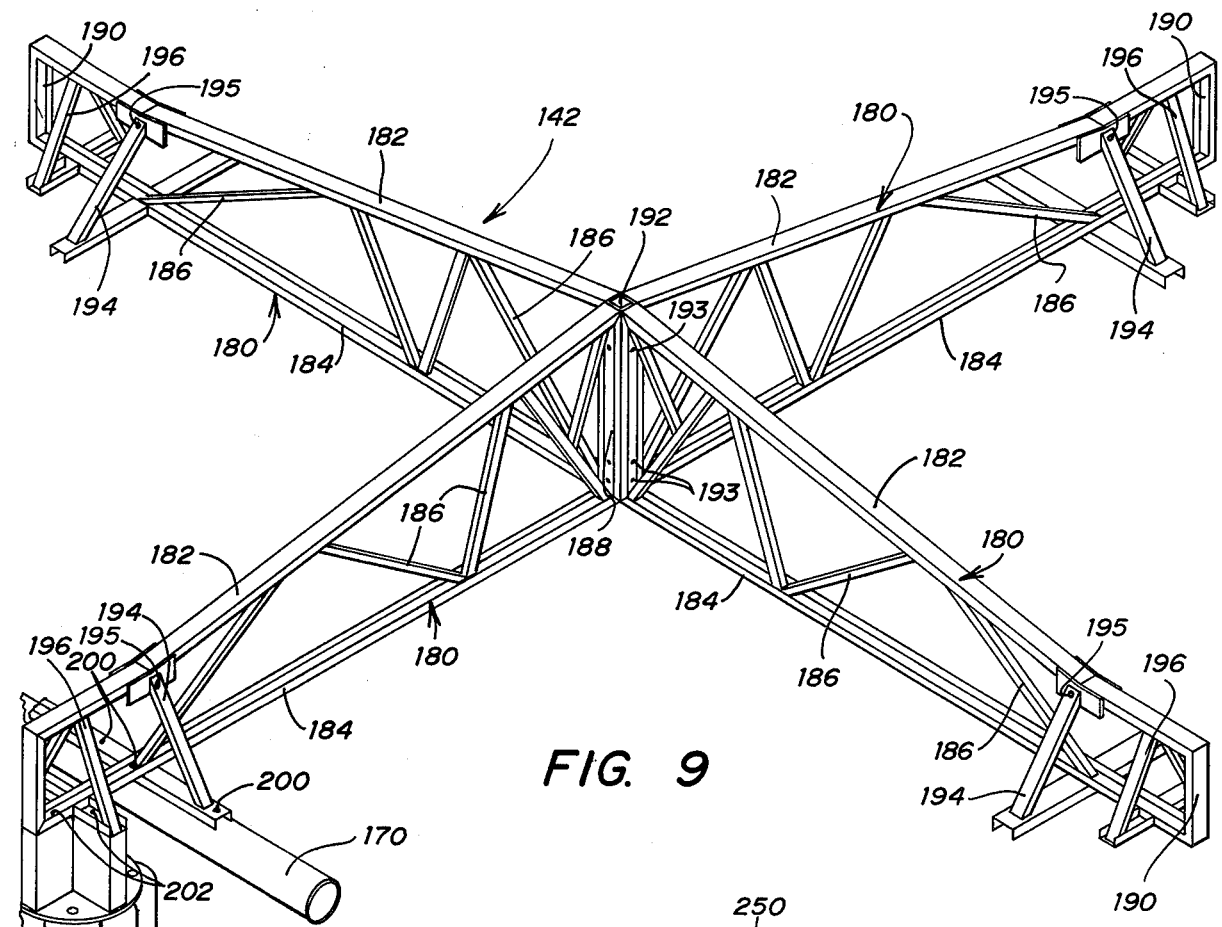
FIG. 9 is a perspective view of the flotation support structure of the monitoring device shown in FIG. 7.

Referring now to FIG. 9, the flotation support structure 142 is illustrated. Support structure 142 includes four truss members identified generally by the numeral 180. Each truss 180 includes a top frame member 182 and a bottom frame member 184. Interconnecting the top and bottom frame members 182 and 184 respectively are diagonal struts 186. The interior ends of top and bottom frame members 182 and 184 are interconnected by a vertical strut 188, while the exterior ends of top and bottom frame members 182 and 184 are interconnected by a vertical strut 190.

The four trusses 180 are interconnected at their interior ends to a center post 192 by bolts 193. A triangular mounting structure 194 is interconnected to the exterior ends of trusses 180 by bolts 195. A second triangular mounting structure 196 is welded to the exterior ends of trusses 180. Mounting structure 194 is utilized to mount the top ring 146 (FIG. 7) to trusses 180, and mounting structure 196 is utilized to mount the flotation structure 144 to trusses 180. Mounting structure 194 is affixed to tube segments 170 utilizing bolts 200. Mounting structure 196 is attached to the flotation structure 144 using bolts 202. All components of the flotation support structure 142 are fabricated from a light weight material such as aluminum channels and tubing which requires minimal maintenance. The flotation support structure 142 is constructed to support the weight of the scientist to permit easy access to the top end of enclosure 148 for the collection of samples.

Figure 10:
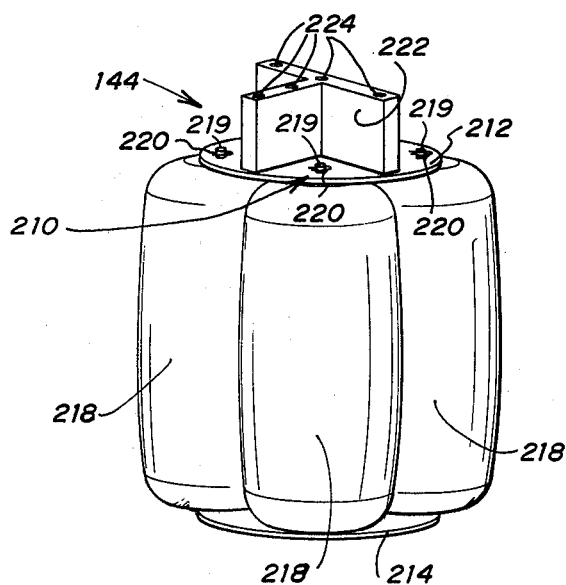
FIG. 10 is a perspective view of the flotation structure of the monitoring device shown in FIG. 7.
Figure 11:
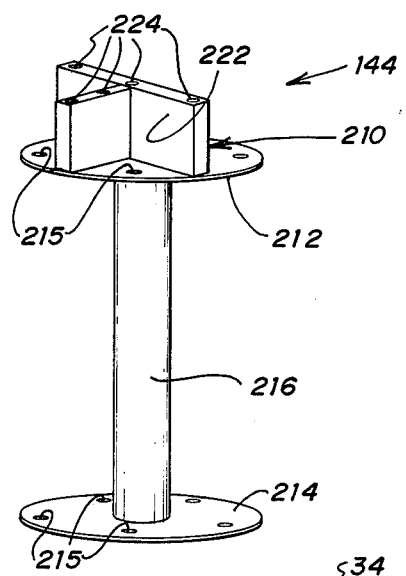
FIG. 11 is a perspective view of the flotation spool of the flotation structure shown in FIG. 10.

Referring simultaneously to FIGS. 10 and 11, the flotation structure 144 of monitor 140 is illustrated. The flotation structure 144 includes a flotation spool identified generally by the numeral 210. The flotation spool 210 includes upper and lower mounting plates 212 and 214, respectively, including apertures 215. The mounting plates 212 and 214 are interconnected by a post 216. Five cylindrical floats 218 are circumferentially mounted around post 216 using aluminum rods 219 and safety clips 220. Cylindrical floats 218 are similar in size, 10 inches by 27 inches in the preferred embodiment, and in construction to floats 26 of biotal monitor 20 (FIGS. 1 and 3). The top plate 212 includes a "T" shaped mounting bracket 222, which mates with the mounting structure 196 of truss 180 (FIG. 9). Mounting bracket 222 includes a plurality of apertures 224 aligned to receive bolts 202 (FIG. 9). In the alternative, flotation structure 144 may comprise a barrel, such as an anodized aluminum drum, filled with polyurathane foam.

Figure 12:
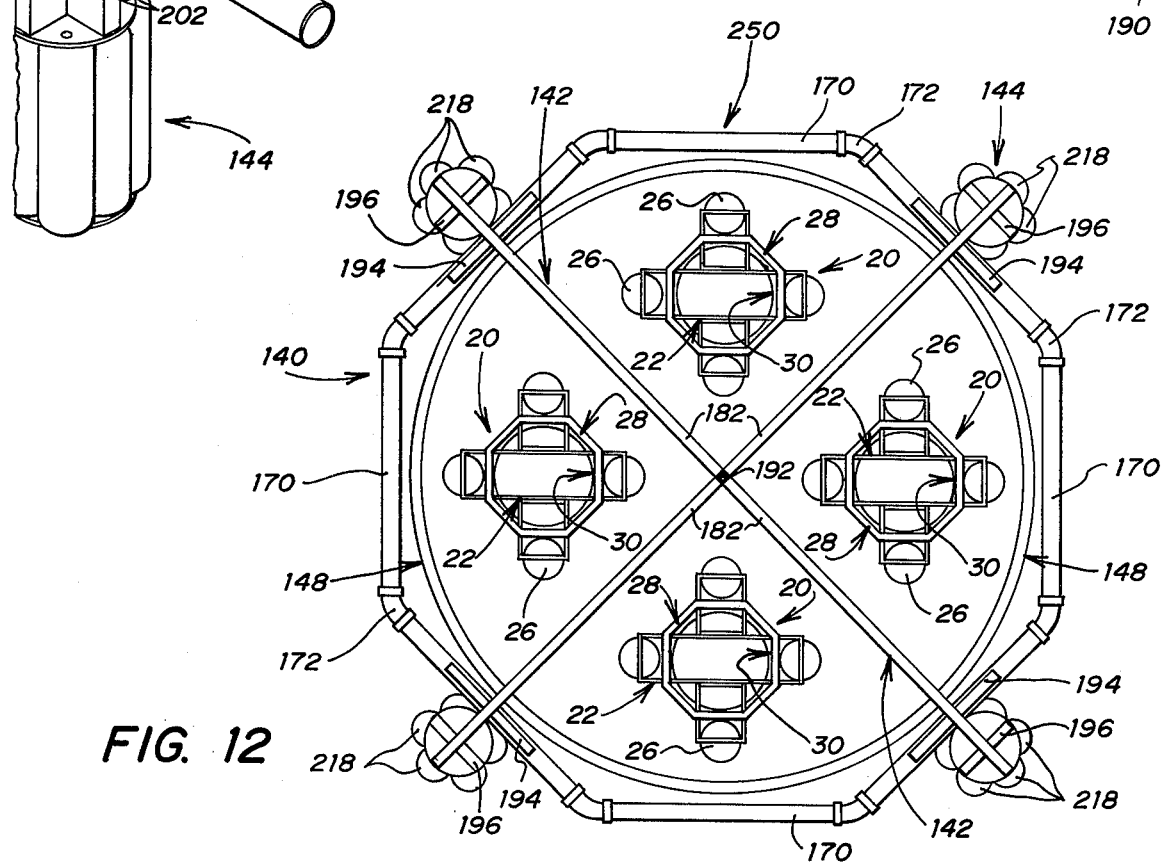
FIG. 12 is a top plan view of the aquatic biotal monitoring system of the present invention.

Referring now to FIG. 12, an aquatic biotal monitoring system 250 is illustrated wherein like numerals are used for like and corresponding elements. Monitoring system 250 includes biotal monitor 140 and four individual biotal monitors 20. The monitor system 250 has the capacity of simultaneously monitoring five samples of the biota. The five samples may be of the same species. For example a control group can be monitored in monitor 140 and four samples exposed to different laboratory environments can be individually placed within monitors 20. In such a test, all five samples would be equally exposed to the ambient body of water to study the chronic impacts of chemical or thermal pollution of the environment upon the biotal samples. At the conclusion of the test, the control sample can then be compared to the four different laboratory samples to determine the relative effect of the aquatic environment upon the samples. Since all samples were exposed to the identical aquatic environment, a meaningful evaluation between the control group and laboratory samples can be made.

An alternative use for the biotal monitor system 250 is to simultaneously study the impact of aquatic pollution on several different samples of the biota. For example, each monitor 20 can monitor a different species of biota while a fifth species can be monitored by the monitor 140. In this arrangement, each of the enclosures 30 of monitors 20 and enclosure 148 of monitor 140 may have different sized mesh apertures. For example, the four enclosures 30 of the monitors 20 may have mesh sizes of 37 microns, 72 microns, 149 microns and 500 microns. The mesh size selected is dependent upon the actual size or type of the biota under study. The mesh size of enclosure 148 of monitor 140 may be larger such as 1000 microns to enclose a larger sized biotal species. This arrangement permits the simultaneous study of five different species exposed to the same chemical or thermal pollution of the aquatic environment. Each of the five samples are individually contained by their respective monitor and therefore, the results of the study are not influenced by the interaction of the biotal samples themselves.

While the system 250 is illustrated using four monitors 20, additional monitors can be placed within enclosure 148 of monitor 140. Monitor 140 can also be greatly increased in diameter to include six or more ocean monitors the size of monitor 20 to monitor the aquatic impact on a biological ecosystem.

Although each monitor 20 of the monitor system 250 is illustrated in FIG. 12 as having floats 26, in the alternative, each monitor 20 can be suspended from the flotation support structure 142 of monitor 140, thereby eliminating the need for floats 26.

Although the aquatic biotal monitors of the present invention have been described as having the capability of freely floating with extant currents, it will be understood that the biotal monitors can be anchored to monitor chronic impacts of various types of pollution in shallow water environments.

It can thus be seen that the aquatic biotal monitors and monitoring system of the present invention permit the detection of chronic impacts of various types of pollution in aquatic environments upon samples of the biota for extended periods of time. The monitors permit the free exchange between the ambient water outside the monitor enclosure and the inside of the enclosure wherein the biotal sample is retained. The free exchange of water permits the biotal sample to be continuously exposed to the ambient environment and changes to that environment. The monitors are structurally sound and lightweight to permit easy transportation to a test site and assembly at the test site. The flotation structure permits the monitor to freely drift with currents to monitor the changing impact of pollutants on the biotal sample as the distance from the initial test site changes.

It will also be seen that the monitors of the present invention retain a biotal sample to permit investigation and identity of the same biotal sample taken at the end of the exposure to the aquatic environment as that which had been exposed to the pollutant at the beginning of a test. The biotal monitors can also be utilized to track ocean currents by equipping each monitor with a light or transmitting source that can be observed from overhead aircraft or received by satellites. The monitors can also be utilized to study the life cycles of organisms that are difficult to raise in a laboratory environment. Further, the monitors of the present invention can be utilized to study organisms that live on the bottom of the sea. The monitor can be anchored for studying the impact over periods of time of pollutants emanating from a single source such as an off-shore oil drilling rig. The monitoring system of the present invention can also be utilized to monitor an ecosystem to study a community of interacting organisms exposed to aquatic pollutants.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A biological monitoring device for monitoring in situ samples of biota in a body of water comprising:
    a top hexagonally shaped mounting ring defining an opening;
    a bottom hexagonally shaped mounting ring;
    a water permeable mesh extending between and interconnected to said mounting rings to form an open-topped cylindrical enclosure, said mesh having apertures therethrough with dimensions for retaining the biotal samples while permitting the free exchange of ambient water from exterior of said enclosure to within said enclosure, thereby uniformly exposing the samples of biota to aquatic pollution found within the body of water;
    a receptacle for collecting material from within said cylindrical enclosure comprising a conical funnel being open at its ends and decreasing in cross-sectional area from one end to the other, the larger end thereof being secured to said cylindrical enclosure and opening thereinto and the smaller end thereof being removably secured to a collection enclosure and opening thereinto for retaining material therein which has fallen to the bottom of said cylindrical enclosure, said collection enclosure being cylindrical in shape with an integral bottom;
    a plurality of floats;
    a plurality of rectangular frame members extending across said open-topped cylindrical enclosure and being interconnected to said top mounting ring at points interior of the exterior ends of said frame members;
    means on said exterior ends of said frame members for receiving at least one of said floats, such that said floats support said frame members to permit said frame members to suspend said top mounting ring above the surface of the body of water to allow the free circulation of ambient water throughout the entire length of said cylindrical enclosure between said mounting rings, thereby uniformly exposing the biotal sample to the ambient water outside said enclosure and to suspend said enclosure in the body of water to permit the biological monitor to freely drift with extant currents to monitor the impact of changing aquatic environments on the biotal sample.

2. The monitoring device of claim 1 wherein said mounting rings comprise a plurality of hollow pipe segments interconnected to elbow members.

3. The monitoring device of claim 1 wherein said means for receiving one of said floats comprises a rectangular subframe perpendicularly mounted to said exterior ends of said frame members and dimensioned to receive said float.

4. The monitoring device of claim 1 wherein said mesh comprises a plurality of rectangular panels joined together by a webbing.

5. The monitoring device of claim 1 wherein the top edge of said mesh includes a collar including a plurality of flexible elongate strap members integral with said collar for interconnecting said mesh to said top mounting ring.

6. The monitoring device of claim 1 wherein said mesh comprises a nylon netting.

* * * * *